April 30, 1935.　　　　　G. A. SMITH　　　　　1,999,215
WELL SURVEYING DEVICE
Filed April 30, 1929　　　2 Sheets-Sheet 1

WITNESS:

INVENTOR
George A. Smith
BY
ATTORNEYS.

April 30, 1935.　　　　G. A. SMITH　　　　1,999,215
WELL SURVEYING DEVICE
Filed April 30, 1929　　　2 Sheets-Sheet 2
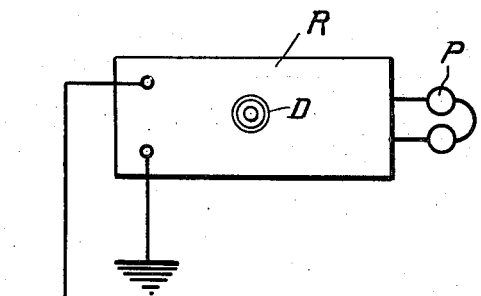
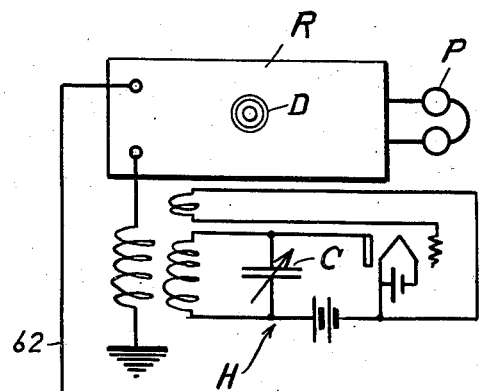
FIG. 2.
FIG. 3.
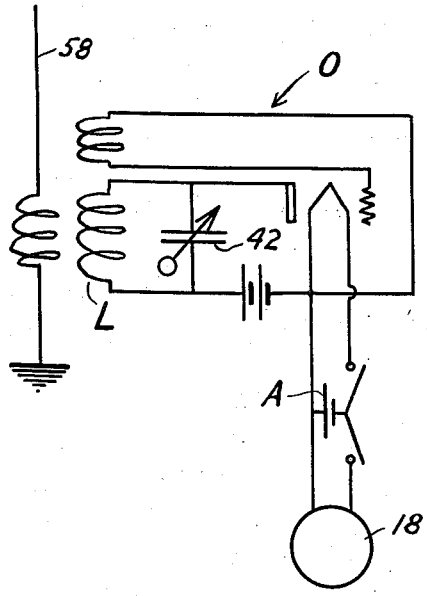
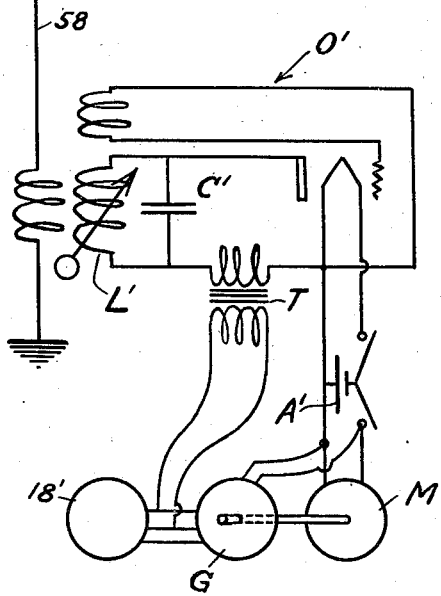
WITNESS:
INVENTOR
George A. Smith
BY
Busser & Harding
ATTORNEYS.

Patented Apr. 30, 1935

1,999,215

UNITED STATES PATENT OFFICE 1,999,215

WELL SURVEYING DEVICE

George A. Smith, Philadelphia, Pa., assignor, by mesne assignments, to Sperry-Sun Well Surveying Company, Philadelphia, Pa., a corporation of Delaware Application April 30, 1929, Serial No. 359,222

12 Claims. (Cl. 177—351)

This invention relates to a well surveying device of the type adapted to be lowered into a bore hole in order to determine the direction which the hole is taking at any given point.

In drilling oil wells or the like, it generally happens, due to variations in the strata through which the drill passes, that the bore hole deviates to a considerable extent from the vertical and may assume very decided angles relative to the vertical direction. By reason of such deviations, serious errors may enter into geological interpretations and recommendations concerning the structure and operation of the well. In view of the resultant desirability of determining the location of the lower part of a bore hole, various devices have heretofore been devised for determining with more or less accuracy the path of the bore hole through the soil.

Heretofore it has been customary to utilize devices of one of two general types in surveying a well. In one type, a pendulum or float carrying a compass is suspended or floated upon a heated liquid which is adapted to congeal at a lower temperature embedding the pendulum or float and holding the same and the compass needle carried thereby in a fixed position. A device of this character is lowered into the bore hole to a given depth, maintained there for a certain period until the liquid cools and congeals and then withdrawn, whereupon the orientation of the pendulum and compass needle may be determined by either viewing the same through the congealable medium, if transparent, or examining the apparatus by means of an X-ray if the medium is not transparent.

A second form of device depends upon the photographic recording of the positions of a pendulum and a compass at predetermined depths.

Both of these forms of device may only give discontinuous readings, the former type necessitating withdrawal from the bore hole after each reading and replacement of the movable parts and liquid medium prior to the taking of a subsequent reading. The latter form, unless made highly elaborate, similarly requires withdrawal after each reading, or else control from the surface, necessitating the extension from the surface to the device of insulated cables which are not only costly but liable to destruction.

It is accordingly the broad object of the present invention to provide a device which will indicate to an observer on the surface continuously during its descent the direction of extent of the portion of the bore hole through which it is passing.

A further object of the invention relates to the provision of means for determining the direction of extent of the bore hole with a high degree of accuracy.

More specific objects of the invention will become apparent from the following specification read in conjunction with the accompanying drawings, in which:

Fig. 2 is a wiring diagram illustrating the component parts of the electrical system incorporated in the device; and Fig. 3 is a wiring diagram of a modified form of the device.

Figure 1:
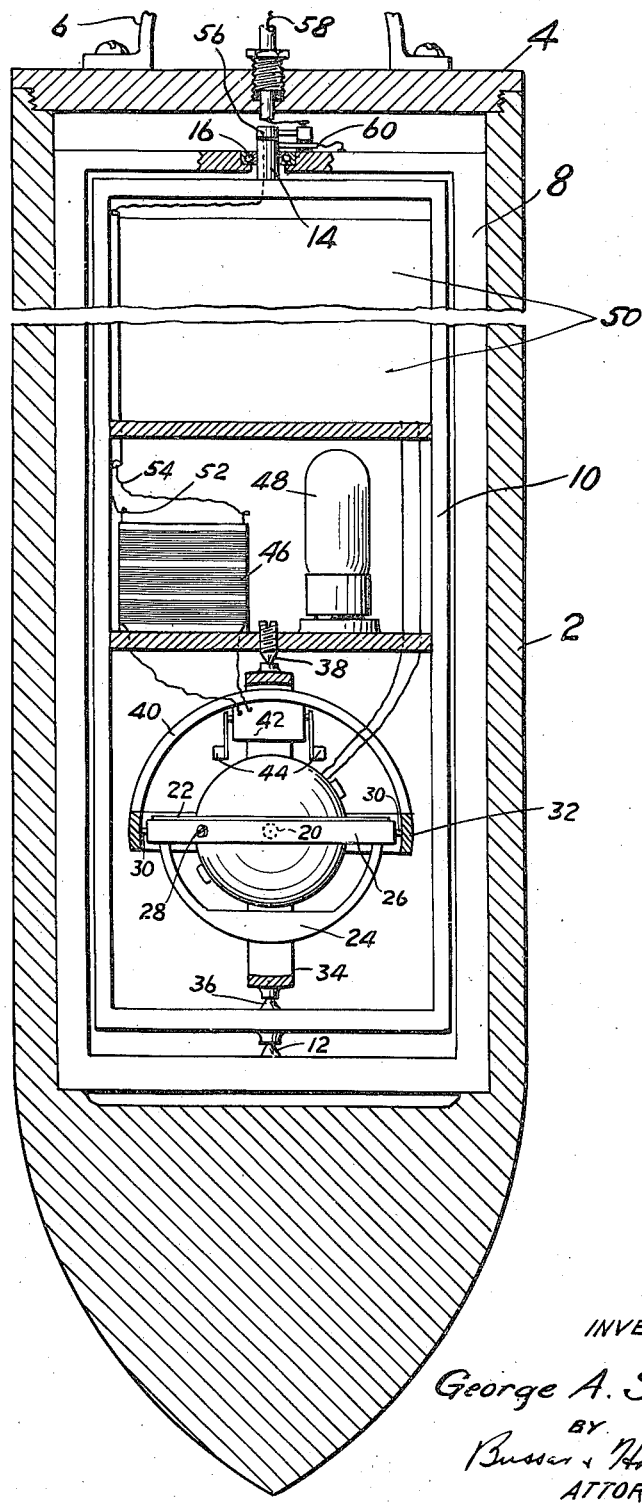
Fig. 1 is a longitudinal sectional view through the casing adapted to be lowered into the bore hole and the contents thereof.

The device broadly consists of two parts, namely the assembly which is carried by the casing and lowered into the bore hole and the surface apparatus enabling the observer to determine the deviation of the bore hole from the vertical. In the present device the lower assembly comprises a source of high frequency oscillations provided with means for modifying the oscillations in accordance with the deviation of the bore hole from the vertical in a given azimuth. The surface apparatus which is adapted either to receive the radiated oscillations or which is directly coupled to the source may be adjusted by the observer to a correspondence with the oscillations whereby the adjustment will give an indication either directly or through suitable calculations of the slope of the bore hole.

The part of the device adapted to be lowered into the bore hole comprises an elongated casing 2 of generally cylindrical shape adapted to pass into the bore hole. The casing shown is provided with a removable cover 4 adapted to form a liquid tight closure therefor, which cover is provided with suitable means 6 for engagement by a supporting cable.

The operating parts of the assembly are carried by a skeleton frame 8 axially slidable into and out of the casing to afford access to the operating parts to permit their adjustment or replacement. A carrying frame 10 is pivotally mounted on an anti-friction bearing 12 carried by frame 8 and is provided with a spindle 14 at its upper end journalled in a ball bearing 16. The frame 10 is provided with a plurality of compartments to support the various parts of the apparatus.

One of the compartments of frame 10 carries a gyroscope 18 and its supporting gimbals. The gyroscope, which may be of any ordinary form, comprises an electrically driven flywheel which may rotate in a vacuum within an enclosed casing. The gyroscope casing is mounted on an axis 20, transverse to the axis of rotation of the flywheel, in a ring 22 carrying a weight 24 adapted to maintain it in a horizontal plane. Ring 22 is rotatably adjustable within a concentric ring 26 and is adapted to be secured in adjusted position by a thumb screw 28. Ring 26 is supported by pivots 30 within a horizontal gimbal ring 32 which in turn is supported in an upright gimbal ring 34 by pivots on an axis perpendicular to the axis of pivots 30 and the axis of the casing. Gimbal ring 34 is mounted for rotation about the axis of the casing by antifriction pivots 36 and 38.

Gimbal ring 32 is provided with a supporting arc 40 carrying a variable condenser 42 of the ordinary type having interleaved fixed and movable plates, the movable plates being mounted on a shaft for rotation about an axis parallel to the axis of pivots 30. The shaft carrying the movable plates carries pendulums 44 maintaining the movable plates in a fixed vertical position. Accordingly any movement of the fixed plates about an axis parallel to the axis of the shaft will result in a change in the capacity of the condenser.

By setting the axis of the gyroscope in a north-south plane, pivots 20 will assume a horizontal east-west direction while pivots 30 will assume a horizontal north-south direction. Consequently, upon deviation of the casing (in other words, of the axis of pivots 36 and 38) from a vertical direction, ring 32 will move about the pivots 30 through an angle from the horizontal corresponding to the component of the angle of inclination in a vertical east-west plane. A corresponding angular relative movement of the fixed and movable condenser plates will take place with a resultant change in capacity of the condenser. If ring 26 is adjusted about ring 22, while maintaining the axis of the gyroscope in a vertical north-south plane, until pivots 30 assume an east-west direction, it will be obvious that the change in capacity of the condenser will be proportional to the component of the angle of inclination of the casing in a vertical north-south plane. The plates of the condenser are arranged so that its capacity is substantially at the mid-point of its range when the casing is vertical, so that not only the amount of inclination but also the direction will be indicated.

In the construction described, all of the pivots are of a suitable type whereby a minimum resistance to movement of the parts is offered. Accordingly, no appreciable precessional movement of the gyroscope will result and its axis will maintain substantially its initial direction. It will be obvious, however, that the gyroscope may be used merely to maintain in one of the well known manners through suitable contacts and a reversing motor the constant azimuth of a set of separate supporting gimbals for the condenser so that its change of capacity will be proportional to deviations from the vertical as outlined above.

The inertia of the casing 10 and the parts carried thereby and its antifriction support further minimize any rotation imparted to the gimbals if the casing rotates during its descent into a bore hole.

The variations of capacity of the condenser are rendered measurable by shunting the same across an inductance to form an oscillatory circuit determining the frequency of oscillations produced in a suitable generating circuit. In Fig. 1 the coils of such circuit are indicated at 46, and a vacuum tube connected in the oscillating circuit is indicated at 48. Current for the gyroscope and the generating circuit is supplied from batteries 50 or through power cables led through the bore hole from the surface to the casing. The connections between a battery and the gyroscope and between the condenser and the generating circuit are such as to permit free movement of the condenser and gyroscope relative to the casing. An aerial inductance is coupled with the generating circuit. This coil is grounded at one side 52 to the frame 10 while the other end 54 is connected to an insulated ring 56 carried by spindle 14 and contacting with a brush connected to an insulated aerial wire 58 suitably packed through cover 4 and extending upwardly in the bore hole along or within the casing supporting cable. A brush 60 contacting with the spindle 14 and connected to frame 8 insures a ground connection of low resistance.

Referring now to Fig. 2 which shows the wiring diagram of the arrangement above discussed and its corresponding surface receiving devices, the generating circuit is indicated generally at O and comprises the inductance L connected in parallel with the variable condenser 42 in the plate circuit of tube 48, the grid circuit of which is coupled with inductance L to produce oscillations whose frequency is determined by the L—42 circuit. It will be understood that other suitable generating circuits may be employed, the constants of the elements being so arranged that high frequency oscillations are generated at permissible frequency throughout the range of variation of the condenser 42. While a variable condenser is used in the oscillating circuit, thus providing a variable capacitive reactance, it will be obvious that the inductive reactance may instead be variable; for example it may consist of a fixed coil and a movable coil mounted on a pendulum controlled shaft. The filament battery A may be used to operate the gyroscope as shown.

Any suitable type of receiving set R may be used at the surface to detect and amplify signals radiated from antenna 58, the set being provided with a receiving aerial 62 which may consist of a length of wire extending into the bore hole or otherwise disposed. As indicated by the dotted line in Fig. 2, a direct connection may be made to the surface using suitable transformers or loading impedances to secure proper transmission of the oscillations.

An oscillating circuit H, provided with a variable tuning reactance, in this case a condenser C, to determine the frequency of its oscillations, is coupled to the receiver R, the output of which is delivered to phones P.

In the operation of surveying a well, the gyroscope will be set, the generating circuit O set into oscillation and the casing closed and lowered into the bore hole. While the casing is below the surface and in a vertical position, the observer listening through phones P will set condenser C of the oscillating circuit H so that the heterodyne whistle heard in the phones and resulting from the simultaneous reception of oscillations from both circuits O and H will be at its lowest pitch. The condenser C will then be set so that the two circuits are in resonance and its reading will correspond to a vertical position of the casing. The casing may now be lowered until the pitch of the heterodyne whistle rises when the observer may note the depth of the casing and set the condenser C to again obtain the lowest pitch of the heterodyne whistle. The reading of the condenser C will then indicate the component of the slope of the bore hole in a plane perpendicular to the axis of the shaft of condenser 42. By calibrating the condenser C in accordance with the angles of inclination of the condenser 42, direct readings of the slope may be made. After the necessary readings are made to the desired depth, the casing may be withdrawn to the surface and the rings 22 and 26 relatively moved through 90° and a second series of readings taken. From the two sets of readings the path of the bore hole may then be calculated.

It will be noted that, since the slightest variation of slope will change the pitch of the heterodyne whistle, the exact location at which a deviation of direction of the bore hole occurs may be determined with great accuracy by a sudden variation in pitch of the whistle. Such determination by prior devices required numerous readings and intermediate calculations which made the determination extremely laborious. With the arrangement disclosed herein readings may be continuously taken with a minimum expenditure of time. Furthermore the angles are directly obtainable from the readings of the dial of condenser C.

While the heterodyne reception method is preferred because of its accuracy and direct indications of deviations of direction, a satisfactory alternative arrangement is illustrated in Fig. 3. In this figure an oscillating circuit O' contains a variable inductance L' in parallel with a fixed condenser C' in the plate circuit to determine the frequency of the oscillations produced. The variable inductance L' consists of two relatively movable coils one of which is fixed to a ring such as 32 while the other is mounted on a shaft carrying a pendulum so that changes of slope of the casing produce changes in the inductance and variations of the frequency corresponding to the component of the slope in a given vertical plane. The filament battery A' in this arrangement drives the motor M of a motor-generator set, the generator G of which produces three phase alternating current for the alternating current gyroscope 18'. The battery A' supplies the D. C. field for the generator. The plate supply of the oscillating circuit is provided through a transformer T which steps up the voltage from generator G. As a result trains of high frequency oscillations are generated which follow each other at the generator frequency. The modulated high frequency oscillations thus produced are received by receiver R with a resultant hum in the phones. In this arrangement the tuning dial D of the receiving set must be set whenever a reading is to be taken to obtain the loudest signal in the phones. When this occurs, the tuning circuit of the receiver is in resonance with the circuit L' C' and the reading of dial D will give an indication of the slope of the casing. If a constant source of plate current is used in a device of this character, it will be clear that any suitable type of modulator may be used either in the generating or receiving circuits to render the generated oscillations audible.

Instead of tube generating circuits it will be clear that spark or buzzer generating circuits may be employed. Decreased sensitivity will, however, result.

It will be noted that the use of a variable impedance permits a continuity of reading so that very slight deviations of direction are determinable.

While with the apparatus disclosed there are necessary two lowerings of the device to obtain a complete survey of the bore hole, two duplicate oscillating circuits may be provided with two variable impedances arranged to indicate slopes in vertical planes at right angles to each other. By designing the two oscillating circuits to generate frequencies in bands which do not overlap, simultaneous readings may be made so that one lowering of the device will suffice for a complete survey.

Various other modifications will be apparent from the above disclosure within the scope of the appended claims.

What I claim and desire to protect by Letters Patent is:

1. A well surveying device comprising a casing adapted to enter a bore hole, means for producing alternating current, means for modifying the frequency of the alternating current in accordance with the inclination of the casing, and means for orienting the modifying means whereby the direction of inclination of the casing as well as its amount is determinable.

2. A well surveying device comprising a casing adapted to enter a bore hole, means for producing alternating current, means for modifying the frequency of the alternating current in accordance with the inclination of the casing, and a gyroscope for orienting the modifying means whereby the direction of inclination of the casing as well as its amount is determinable.

3. A well surveying device comprising a casing adapted to enter a bore hole, means for producing alternating current including an oscillating circuit in the casing, a reactance in said circuit variable in accordance with the inclination of the casing whereby the frequency of the current produced is correspondingly varied, and means for orienting the reactance whereby the direction of inclination of the casing as well as its amount is determinable.

4. A well surveying device comprising a casing adapted to enter a bore hole, means in the casing for generating high frequency oscillations, means in the casing for modifying the oscillations in accordance with the inclination of the casing, means for orienting the modifying means, and means for detecting the oscillations and rendering the modifications observable.

5. A well surveying device comprising a casing adapted to enter a bore hole, means in the casing for generating high frequency oscillations, means in the casing for modifying the oscillations in accordance with the inclination of the casing, a gyroscope for orienting the modifying means, and means for detecting the oscillations and rendering the modifications observable.

6. A well surveying device comprising a casing adapted to enter a bore hole, a vacuum tube generator of high frequency oscillations in the casing, a reactance in the casing variable in accordance with the inclination of the casing whereby the frequency of the oscillations produced is correspondingly varied, means for orienting the reactance, power supplies in the casing for the oscillation generator, said generator serving to radiate the variable frequency oscillations, and means for rendering the change of frequency observable at a station isolated from the casing.

7. A well surveying device comprising a casing adapted to enter a bore hole, a vacuum tube generator of high frequency oscillations in the casing, a reactance in the casing variable in accordance with the inclination of the casing whereby the frequency of the oscillations produced is correspondingly varied, a gyroscope for orienting the reactance, power supplies in the casing for the oscillation generator and the gyroscope, said generator serving to radiate the variable frequency oscillations, and means for rendering the change of frequency observable at a station isolated from the casing.

8. A well surveying device comprising a casing adapted to enter a bore hole, means in the casing for generating alternating current, means for modifying the alternating current in accordance with the position of the casing, and means for orienting the modifying means whereby the direction of inclination of the casing as well as its amount is determinable.

9. A well surveying device comprising a casing adapted to enter a bore hole, a vacuum tube generator of high frequency oscillations in the casing, a reactance in the casing variable in accordance with the inclination of the casing whereby the frequency of the oscillations produced is correspondingly varied, a gyroscope for orienting the reactance, power supplies in the casing for the oscillation generator and the gyroscope, a radiating antenna arranged to extend upwardly in the bore hole from the casing, and means for rendering the change of frequency observable at a station isolated from the casing.

10. A well surveying device comprising a casing adapted to enter a bore hole, means in the casing for generating high frequency oscillations, means for changing the frequency of the oscillations in accordance with the position of the casing, means for orienting the frequency changing means whereby the direction of inclination of the casing as well as its amount is determinable, a radiating antenna arranged to extend upwardly in the bore hole from the casing, and means for rendering the change of frequency observable at a station isolated from the casing.

11. A well surveying device comprising a casing adapted to enter a bore hole, means for producing high frequency oscillations in elements within the casing, means in the casing for modifying the oscillations in accordance with the inclination of the casing, means for orienting the modifying means, and means for detecting the oscillations and rendering the modifications observable.

12. A well surveying device comprising a casing adapted to enter a bore hole, means for producing high frequency oscillations in elements within the casing, means for modifying the oscillations in accordance with the inclination and orientation of the casing, said last means including a reactance and means for orienting the reactance, and means for detecting the oscillations and rendering the modifications observable.

GEORGE A. SMITH.